(12) United States Patent
Rauschenbach et al.

(10) Patent No.: US 7,018,296 B2
(45) Date of Patent: Mar. 28, 2006

(54) GEAR DRIVE WITH INTEGRATED TORQUE LIMITING COUPLING

(75) Inventors: Stefan Rauschenbach, Grosspostwitz (DE); Andreas Roth, Schirgiswalde (DE); Johannes Jacob, Obergurig (DE); Silke Muller, Grossdubrau (DE)

(73) Assignee: GKN Walterscheid Getriebe GmbH, (DE)

( * ) Notice: Subject to any disclaimer, the term of this patent is extended or adjusted under 35 U.S.C. 154(b) by 0 days.

(21) Appl. No.: 10/133,171

(22) Filed: Apr. 26, 2002

(65) Prior Publication Data

US 2002/0160841 A1     Oct. 31, 2002

(30) Foreign Application Priority Data

Apr. 27, 2001   (DE) .................. 101 20 758

(51) Int. Cl.
*F16D 7/00*     (2006.01)
(52) U.S. Cl. ........................... 464/30; 192/150
(58) Field of Classification Search ........... 464/7, 464/10, 30, 37, 45–48; 192/56.1, 56.2, 150; 475/263–265
See application file for complete search history.

(56) References Cited

U.S. PATENT DOCUMENTS

| | | | | |
|---|---|---|---|---|
| 1,445,272 A | * | 2/1923 | Gill | 464/7 |
| 3,653,226 A | | 4/1972 | Westbury | 64/29 |
| 4,075,910 A | * | 2/1978 | Davis et al. | 475/265 |
| 4,128,023 A | * | 12/1978 | Kinder | 475/141 |
| 4,231,443 A | | 11/1980 | van der Lely | 180/53 D |
| 4,561,855 A | * | 12/1985 | Kondo | 464/47 |
| 4,610,339 A | * | 9/1986 | Ciolli | 192/48.92 |
| 4,828,095 A | | 5/1989 | Kilwin | 192/150 |
| 5,299,666 A | | 4/1994 | Lang et al. | 188/134 |
| 6,305,515 B1 | * | 10/2001 | Heidenreich et al. | 192/18 A |
| 6,575,282 B1 | * | 6/2003 | Perlick et al. | 192/56.6 |

FOREIGN PATENT DOCUMENTS

| | | |
|---|---|---|
| DE | 37 14914 C2 | 4/1989 |
| DE | 39 07 154 C2 | 9/1989 |
| DE | 40 02 303 A1 | 1/1990 |
| JP | 53-131178 | 10/1978 |
| JP | 58-46228 | 3/1983 |
| JP | 58-142029 | 8/1983 |
| JP | 04191550 A | 7/1992 |
| JP | 8-61382 | 3/1996 |
| JP | 2001-82501 | 3/2001 |
| WO | WO 01/32354 | 5/2001 |

\* cited by examiner

*Primary Examiner*—Kenneth Thompson
(74) *Attorney, Agent, or Firm*—Harness, Dickey & Pierce, P.L.C.

(57) ABSTRACT

A gear drive has a drive housing (1, 2) with a driveshaft (3) exiting the drive housing (1, 2) through a bore (10). The driveshaft 13 is rotatably supported in the drive housing (1, 2) around an axis of rotation X—X. A connecting shaft (7) is arranged inside the drive housing (1, 2). The connecting shaft (7) is connected in a rotationally fast way to a drive gear (35). A torque limiting coupling (4) is arranged inside the drive housing (1, 2). The input end of the torque limiting coupling (4) is connected to the driveshaft (3). The output end of the torque limiting coupling (4) is connected to the connecting shaft (7). The driveshaft (3) and the connecting shaft (7) are supported relative to one another by a radial bearing (30). The gear drive ensures that the driveshaft (3) and the connecting shaft (7) can more easily accommodate bending moments and transverse forces.

16 Claims, 2 Drawing Sheets

GEAR DRIVE WITH INTEGRATED TORQUE LIMITING COUPLING

CROSS-REFERENCE TO RELATED APPLICATION

This application claims priority to German Patent Application No. 10120758.1 filed Apr. 27, 2001, which application is herein expressly incorporated by reference.

BACKGROUND AND SUMMARY OF THE INVENTION

The invention relates to a gear drive with a torque limiting coupling to protect drive-lines in machinery, especially agricultural implements or machinery. Torque limiting couplings arranged at input shafts, which lead to gear drives, are known. Splines are used to connect the input shaft of the gear drive to the overload coupling.

DE 41 37 829 C2 illustrates a torque limiting coupling with an outer part and an inner part. The inner part has an axially extending slip-on bore with splines. The coupling can be slipped onto corresponding splines of a drive input shaft.

DE 32 05 513 C1 illustrates a torque limiting coupling with an outer part and an inner part. The inner part changes into a hub portion. The hub portion includes a blind bore with splines. Thus, the inner part can be slipped onto a drive input shaft with corresponding splines.

The outer parts of both couplings can be connected to a further shaft or change into a joint yoke of a universal joint. A disadvantage of these embodiments is that the input shaft of the gear drive freely projects in the region of the torque limiting coupling. Accordingly, the input shaft accommodates bending moments and transverse forces to only a limited extent.

In addition, the torque limiting coupling is subjected to external influences. This leads to a higher degree of wear, which disadvantageously affects the reaction moment and the service life of the torque limiting coupling.

SUMMARY OF THE INVENTION

It is the object of the present invention to provide an assembly between the gear drive and the torque limiting coupling. The shafts connected to the torque limiting coupling more easily accommodate bending moments and transverse forces. Thus, the torque limiting coupling is protected from external influences.

In accordance with the invention, a gear drive includes a drive housing, a driveshaft, the driveshaft exits the drive housing through a bore. The driveshaft is rotatably supported in the drive housing around an axis of rotation. A connecting shaft is arranged inside the drive housing. The connecting shaft is rotatably supported around the axis of rotation. The connecting shaft is connected to a gear of a drive stage in a rotationally fast way. A torque limiting coupling is arranged inside the drive housing. At an input end of the torque limiting coupling, it is connected to the driveshaft. The output end of the torque limiting coupling is connected to the connecting shaft. The driveshaft and the connecting shaft are supported relative to one another by a radial bearing.

The torque limiting coupling is arranged inside the drive housing. This ensures that the torque limiting coupling is protected from external influences. Also, the torque limiting coupling is positioned within the lubrication range of the gear drive. Thus, the torque limiting coupling does not have to be lubricated separately.

The connecting shaft is able to accommodate bending moments and transverse forces. This is due to the fact that the connecting shaft is supported in the drive housing and that it is supported directly relative to the driveshaft. The connecting shaft, therefore, does not project.

To support the driveshaft and the connecting shaft relative to one another, the connecting shaft includes a journal. The journal is supported in an axially extending bearing bore of the driveshaft. In a preferred embodiment, a radial bearing is provided in the form of a needle bearing.

To ensure the widest possible supporting range for the driveshaft, the driveshaft is supported by two tapered roller bearings in the drive housing. The lines of application of support of the rolling contact members of each tapered roller bearing intersect one another in one point of support. The two tapered roller bearings are arranged between the points of support. The tapered roller bearings are arranged in a so-called O-arrangement relative to one another. The arrangement ensures as wide a supporting range as possible for a shaft. The lines of application extend at a right angle relative to the longitudinal axis of the tapered rollers. The lines of application intersect the longitudinal axis of the to be supported shaft. The point of intersection of the lines of application of all tapered rollers of a tapered roller bearing with the longitudinal axis of the roller defines the point of support of the tapered roller bearing. In the present case, the point of support of a tapered roller bearing faces away from the adjoining tapered roller bearing. Thus, a long distance between the points of support of both tapered roller bearings is achieved.

The radial bearing is preferably arranged closest to the torque limiting coupling in the region of the lines of application of the rolling contact bearing of the driveshaft. Thus, the radial bearing is arranged in the region of the point of support of a tapered roller bearing. In consequence, transverse forces and bending moments can be transmitted by the connecting shaft via the radial bearing to the tapered roller bearing.

To ensure that the drive does not have to be completely dismantled to carry out work at the torque limiting coupling, the drive housing includes a housing body that forms a first inner chamber. Also, a housing cover is removably connected to the housing body. The cover forms a second inner chamber. The bore through which the driveshaft exits the drive housing is provided in the housing cover. The driveshaft is supported in the bore of the housing cover.

According to a preferred embodiment, a seal is arranged between the two tapered roller bearings. Accordingly, the second inner chamber is sealed relative to the first inner chamber. A shaft sealing ring is provided at that end of the driveshaft which faces away from the torque limiting coupling. Accordingly, the second inner chamber is sealed towards the outside. Thus, a separate inner chamber is provided to support the connecting shaft in the housing cover.

To ensure improved lubrication of the radial bearing, a connecting bore is provided. The connecting bore connects the first inner chamber to the second inner chamber. The connecting bore is in a wall of the housing cover. The connecting bore starts from the first inner chamber and ends in a region between the two tapered roller bearings in the second inner chamber.

A radial bore in the driveshaft is positioned between the shaft sealing ring and the tapered roller bearing which is arranged nearest to the shaft sealing ring. The radial bore starts from an outer circumferential face of the driveshaft. The radial bore changes into an axial bore which ends in a basal face of the bearing bore of the driveshaft.

Tapered roller bearings have a centrifugal pumping effect. Thus, lubricating oil is pumped axially from one side of the tapered roller bearing to the other side of the tapered roller bearing (towards the point of support). This effect is due to the fact that the inner diameter of the outer race increases in the direction of the point of support. Thus the lubricating oil is accelerated to higher circumferential speeds. Accordingly, as a result of the centrifugal forces, the oil is pressed against the inner face of the outer race. The lubricating oil flows axially into regions of the inner face with a greater internal diameter. Thus, lubricating oil can move from the first inner chamber through the connecting bore into the second inner chamber. The oil flows into the region between the two tapered roller bearings. The second inner chamber is sealed towards the first inner chamber. Accordingly, the tapered roller bearing closest to the torque limiting coupling cannot pump any oil back into the first inner chamber. The tapered roller bearing remote from the torque limiting coupling pumps the oil between the two tapered roller bearings towards the shaft sealing ring. On the side of the tapered roller bearing which faces away from the torque limiting coupling, the oil is able to flow through the radial bore and through the axial bore into the bearing bore. Here, the oil lubricates the radial bearing.

The torque limiting coupling is preferably a locking member coupling such as a ratchet clutch. For example, it can be a locking member coupling according to U.S. Pat. No. 4,468,206 or a locking member coupling according to U.S. Pat. No. 5,342,241.

The locking member coupling includes an outer part and an inner part. The outer part forms a unit with the driveshaft. The inner part forms a unit with the connecting shaft. The outer part is preferably welded to the driveshaft. The inner part can be integral with the connecting shaft. Alternatively, the connecting shaft includes splines and the inner part includes an axial through-bore with complementary splines. Via the splines, the inner part is slipped on to the connecting shaft.

To improve lubrication of the locking member coupling, the connecting shaft includes a bore. The bore starts from an end face, for lubricating purposes, leads to the locking members of the locking member coupling. To avoid increased wear, the locking member coupling is lubricated from the inside through the bore in the connecting shaft. Furthermore, through this arrangement, it is possible to ensure a uniform and constant friction behaviour of the locking member coupling and to minimise the scatter range of the reaction moment of the coupling for the duration of its service life. The connecting shaft is preferably supported by a rolling contact bearing in the drive housing. The rolling contact bearing may be formed by a self-aligning roller bearing.

BRIEF DESCRIPTION OF THE DRAWINGS

Preferred embodiments will be explained below in greater detail with reference to the drawings wherein.

DETAILED DESCRIPTION OF THE PREFERRED EMBODIMENT

Figure 1:
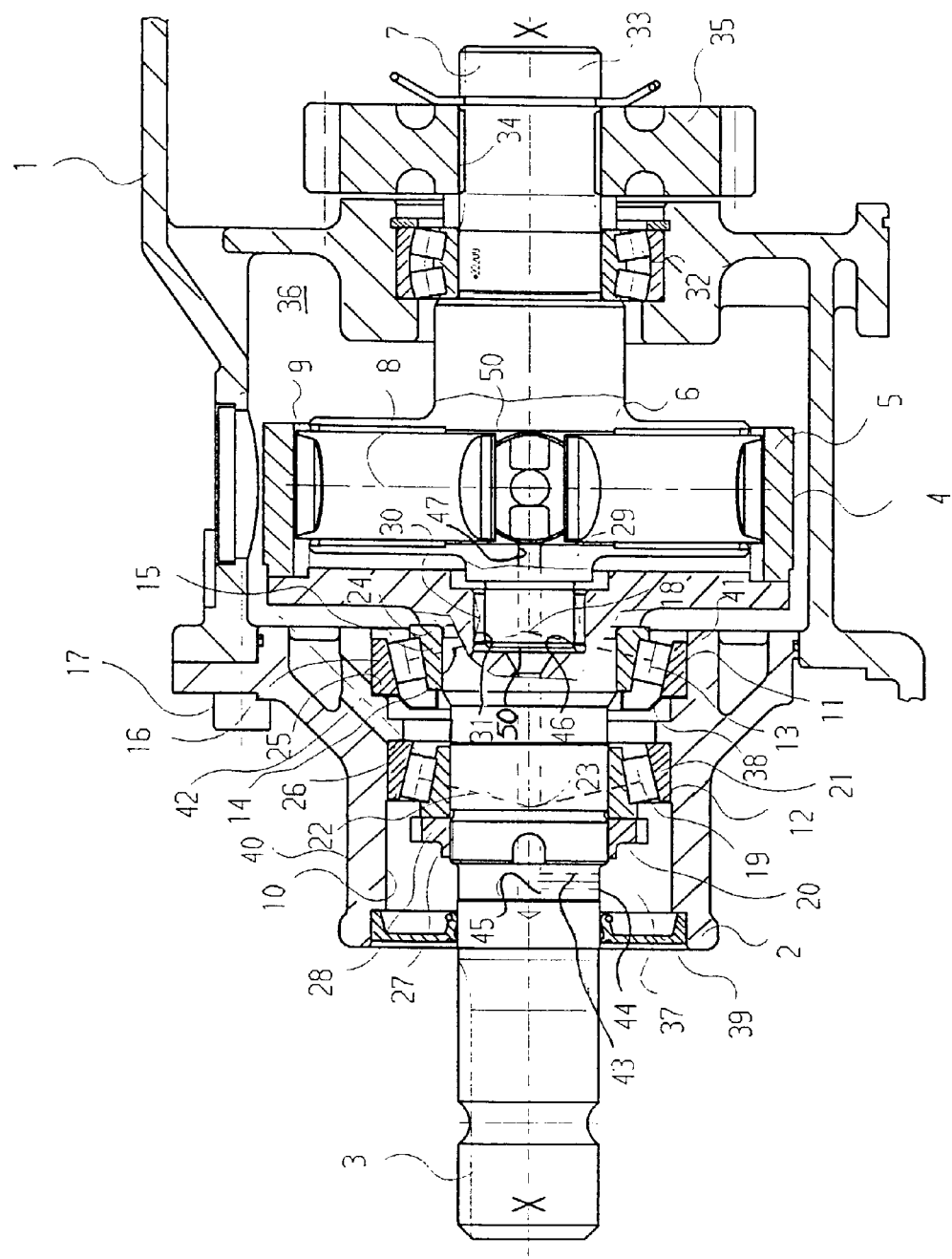
FIG. 1 is a cross section view of a gear drive with an integrated torque limiting coupling with an inner part of the torque limiting coupling integral with a connecting shaft.

FIG. 1 illustrates a gear drive with a drive body 1 and a drive cover 2. Together, the drive body 1 and drive cover form a drive housing. A driveshaft 3 is supported in the drive cover 2. The driveshaft 3 is rotatable around an axis of rotation X—X. The driveshaft 3, with respect to drive, is connected to a torque limiting coupling 4. For this purpose, the driveshaft 3 is welded to an outer part 5 of the torque limiting coupling 4. The torque limiting coupling includes an inner part 6. The inner part 6 integrally changes into a connecting shaft 7. The torque limiting coupling 4 is provided in the form of a ratchet clutch. The connecting shaft 7 is rotatably arranged inside the drive body 1 around the axis of rotation X—X.

Locking members 8 are radially displaceably arranged in the inner part 6. The locking members 8 engage grooves 9 of the outer part 5. This ensures a rotationally fast connection between the inner part 6 and the outer part 5. When a certain torque value is exceeded, the locking members 8 are pressed out of the grooves 9 against a spring force. The locking member 8 are radially displaced towards the axis of rotation X—X. Thus, the outer part 5 can be rotated relative to the inner part 6. Further details on functioning are contained in U.S. Pat. No. 4,468,206.

The housing cover 2 includes a bore 10 which extends co-axially relative to the axis of rotation X—X. The driveshaft 3 exits the drive housing through the bore 10. The driveshaft 3 is supported by a first tapered roller bearing 11 and by a second tapered roller bearing 12. The first tapered roller bearing 11 and the second tapered roller bearing 12 are arranged relative to one another in a so-called O-arrangement. The first rolling contact members 13 of the first tapered roller bearing 11 have lines of application 14. The lines of application 14 indicate the direction of force transmission from a first inner race 15 to a first outer race 16 of the first tapered roller bearing II. The first lines of application 14 intersect the axis of rotation X—X in a first point of support 18. The first point of support 18 faces away from the second tapered roller bearing 12. In accordance with the first tapered roller bearing 11, the second tapered roller bearing 12 includes a second rolling contact members 19, a second inner race 20 and a second outer race 21. Second lines of application 22 of the second rolling contact members 19 intersect the axis of rotation X—X in a second point of support 23. The second point of support 23 is remote from the first tapered roller bearing 11. Thus, a distance is achieved between the first point of support 18 and the second point of support 23. The distance is greater than the distance between the first tapered roller bearing and the second tapered roller bearing. The so-called O-arrangement ensures a wide range of support in order to reduce the length of projecting shaft portions.

The first inner race 15 of the first tapered roller bearing 11 is supported against a shoulder 24 of the driveshaft towards the torque limiting coupling 4. The first outer race 16 is supported against a shoulder 25 of the drive cover 2 towards the torque limiting coupling 4. The second outer race 21 is supported against a shoulder 26 in the drive cover 2 towards the torque limiting coupling 4. The driveshaft 3 includes a thread 27 for threading on a shaft nut 28. The shaft nut 28 is supported against the second inner race 20. Thus, the shaft nut 28 can be used for pre-tensioning. Accordingly, the shaft nut may pretension the bearing assembly including the first tapered roller bearing 11 and the second tapered roller bearing 12.

The connecting shaft 7 includes a cylindrical journal 29 which faces the driveshaft 3. The journal 29 is arranged co-axially relative to the axis of rotation X—X. The journal 29 is supported by a needle bearing 30 in a cylindrical bearing bore 31 of the first driveshaft 3. The bearing bore 31 is arranged co-axially relative to the axis of rotation X—X. The needle bearing 30 is arranged in the region of the first point of support 18. Radial forces which are transmitted by the journal 29, via the needle bearing 30, to the driveshaft 3 can be passed on, via the first tapered roller bearing 11, to the drive cover 2.

The connecting shaft 7 is supported in the drive body 1 by a self-aligning roller bearing 32. At its shaft end 33, facing away from the journal 29, the connecting shaft 7 includes longitudinal teeth 34. A gear 35 of a drive is slipped onto the teeth 34.

The drive body 1 forms a first inner chamber 36 and the drive cover 2 forms a second inner chamber 37. At its end facing the second tapered roller bearing 12, the first tapered roller bearing 11 is provided with a covering disc 38. The covering disc 38 seals the second inner chamber 37 relative to the first inner chamber 36.

An axial shaft sealing ring 39 is provided in the bore 10 of the drive cover 2. The axial shaft sealing ring 39 seals the second inner chamber 37 towards the outside.

The bore 10 is formed in a cylindrical cover portion 40. The cylindrical cover portion 40 includes a wall 41, which projects into the first inner chamber 36. A connecting bore 42 is provided. In the wall 41, the connecting bore 42 provides a passage for lubricating oil between the first inner chamber 36 and the second inner chamber 37. The connecting bore 42 starts from the first inner chamber 36 and ends in the second inner chamber 37 in the region between the first tapered roller bearing 11 and the second tapered roller bearing 12.

Tapered roller bearings have a centrifugal pumping effect. Accordingly, lubricating oil is pumped axially towards the point of support. When the driveshaft 3 carries out a rotational movement, the second tapered roller bearing 12 pumps lubricating oil from its end facing the torque limiting coupling 4 to its end facing away from the torque limiting coupling 4. The covering disc 38 prevents lubricating oil from being pumped from the first tapered roller bearing 11 back into the first inner chamber 36. In the region between the second tapered roller bearing 12 and the shaft sealing ring 39, the driveshaft 3 has a radial bore 43. The radial bore 43 starts from an outer circumferential face 44 of the driveshaft 3 and ends in an axial bore 45. The axial bore 45, in turn, ends in a basal face 46 of the cylindrical bearing bore 31. The oil can thus penetrate from the second inner chamber 37, via the radial bore 43 and axial bore 45, into the bearing bore 31. Thus, this passage ensures the lubrication of the needle bearing 30. After the needle bearing 30 has been lubricated, the lubricating oil flows back into the first inner chamber 36.

The housing cover 2 is removably connected to the housing body 1 by bolts 17. Thus, the torque limiting coupling 4 can be reached by removing the housing cover 2 from the drive body 1. Since the driveshaft 3 is firmly connected to the housing cover 2 by the tapered roller bearings 11, 12, the driveshaft 3 may be removed from the journal 29 of the connecting shaft 7 when the housing cover 2 is removed. Furthermore, the outer part 5 of the torque limiting coupling 4 is designed to be pulled off the inner part 6. Accordingly, the torque limiting coupling is accessible without the need to completely dismantle the drive.

Figure 2:
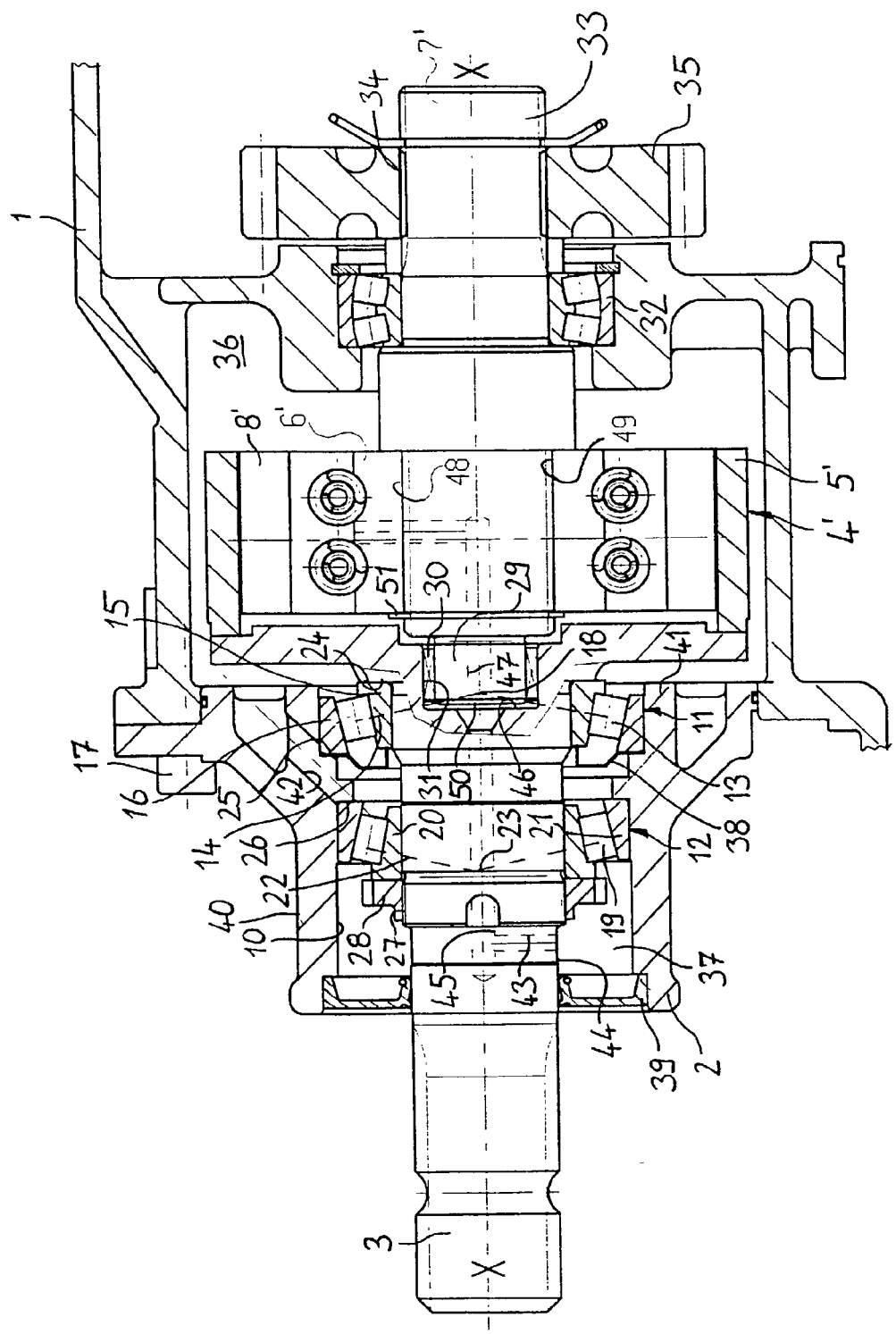
FIG. 2 is a cross section view of a gear drive with an integrated torque limiting coupling with an inner part of the torque limiting coupling including a bore slipped on to the connecting shaft.

FIG. 2 shows a gear drive according to FIG. 1, with a different torque limiting coupling. Any components in FIG. 2 which correspond to drive components according to FIG. 1 have been given the same reference numbers as in FIG. 1.

A torque limiting coupling 4' includes an inner part 6' provided with a through-bore 49. The through-bore 49 includes splines. The inner part 6' is slipped on to the separately produced connecting shaft 7'. The connecting shaft 7 is axially secured by a securing ring 51. Locking members 8' are radially displaceably arranged in the inner part 6'. In order to transmit torque, the locking members 8' engage grooves in the outer part 5'. The mode of functioning is described in the patent specification U.S. Pat. No. 5,342, 241.

While the above detailed description describes the preferred embodiment of the present invention, the invention is susceptible to modification, variation and alteration without deviating from the scope and fair meaning of the subjoined claims.

What is claimed is:

1. A gear drive comprising:
   a drive housing;
   a driveshaft exiting the drive housing through a bore, the driveshaft being rotatably supported in the drive housing by a bearing around an axis of rotation;
   a connecting shaft arranged inside the drive housing, said connecting shaft being rotatably supported by a bearing around the axis of rotation, and said connecting shaft connected to a drive gear in a rotationally fast way and said drive gear positioned inside said drive housing;
   a torque limiting coupling arranged inside the drive housing, an input end of said torque limiting coupling connected to the driveshaft and an output end of said torque limiting coupling connected to the connecting shaft wherein the driveshaft or the connecting shaft has a shaft portion supported by a radial bearing wherein said radial bearing is supported by said driveshaft or said connecting shaft lacking said shaft portion.

2. A gear drive according to claim 1, the connecting shaft includes a journal supported in an axially extending bearing bore of the driveshaft.

3. A gear drive according to claim 2, wherein the radial bearing is formed by a needle bearing.

4. A gear drive according to claim 1, wherein the driveshaft is supported by two tapered roller bearings in the drive housing, lines of application of the support of the rolling contact members of each tapered roller bearing intersect one another in a point of support and said two tapered roller bearings being arranged between the points of support.

5. A gear drive according to claim 4, wherein the radial bearing is arranged in the region of the lines of application of the tapered roller bearing of the driveshaft, which is arranged nearest to the torque limiting coupling.

6. A gear drive according to claim 1, wherein the drive housing comprises a housing body which forms a first inner chamber and a housing cover removably connected to the housing body and forms a second inner chamber, said bore through which the driveshaft exits the drive housing is provided in the housing cover, and the driveshaft is supported in the bore of the housing cover.

7. A gear drive according to claim 6, wherein a seal is arranged between the two tapered roller bearings, said second inner chamber being sealed relative to the first inner chamber by said seal, and a shaft sealing ring provided at an end of the driveshaft facing away from the torque limiting coupling, said shaft sealing ring sealing the second inner chamber towards the outside.

8. A gear drive according to claim 6, wherein a connecting bore connects the first inner chamber to the second inner chamber, said connecting bore being provided in a wall of the housing cover, said connecting bore starting from the first inner chamber, and ending in a region between the two tapered roller bearings in the second inner chamber, and a radial bore in said driveshaft between the shaft sealing ring and the tapered roller bearing arranged nearest to the shaft sealing ring, said radial bore starting from an outer circumferential face of the driveshaft and changing into an axial bore which ends in a basal face of the bearing bore of the driveshaft.

9. A gear drive according to claim 1, wherein the torque limiting coupling is formed by a locking member coupling.

10. A gear drive according to claim 9, wherein the locking member coupling includes an outer part and an inner part, said outer part forming a unit with the driveshaft and said inner part forming a unit with the connecting shaft.

11. A gear drive according to claim 10, wherein the outer part is welded to the driveshaft.

12. A gear drive according to claim 10, wherein the inner part is integral with the connecting shaft.

13. A gear drive according to claim 10, wherein the connecting shaft includes splines and said inner part includes an axial through-bore with complementary splines, said inner part being slipped onto the splines of the connecting shaft.

14. A gear drive according to claim 9, wherein the connecting shaft comprises a bore starting from an end face and, for lubricating purposes, leads to the locking members of the locking member coupling.

15. A gear drive according to claim 1, wherein the connecting shaft is supported by a rolling contact bearing in the drive housing.

16. A gear drive according to claim 15, wherein the rolling contact bearing is formed by a self-aligning roller bearing.

* * * * *

UNITED STATES PATENT AND TRADEMARK OFFICE
CERTIFICATE OF CORRECTION

PATENT NO. : 7,018,296 B2
APPLICATION NO. : 10/133171
DATED : March 28, 2006
INVENTOR(S) : Rauschenbach et al.

It is certified that error appears in the above-identified patent and that said Letters Patent is hereby corrected as shown below:

Title Page
Item [75] Inventors, 4th Inventor (Silke Muller) "Grossdudbrau" should be --Großdudrau--

Signed and Sealed this

Twenty-fifth Day of July, 2006

JON W. DUDAS
*Director of the United States Patent and Trademark Office*